Nov. 18, 1947.    E. PELL    2,430,992
BRAKING SYSTEM FOR POLYPHASE INDUCTION MOTORS
Filed July 30, 1945
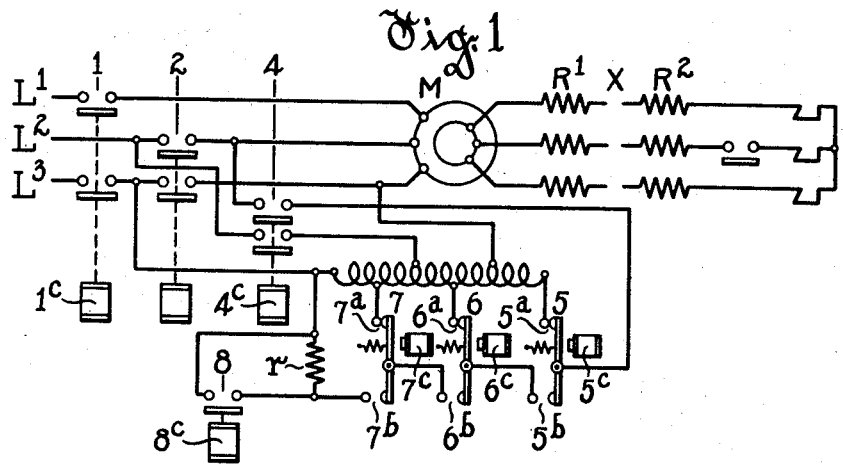
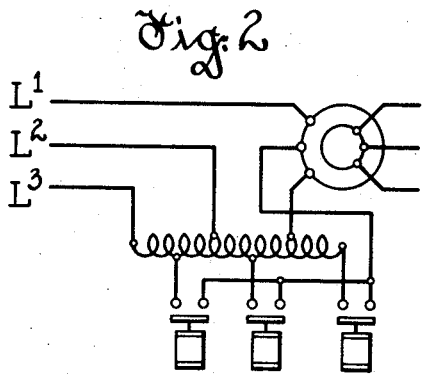 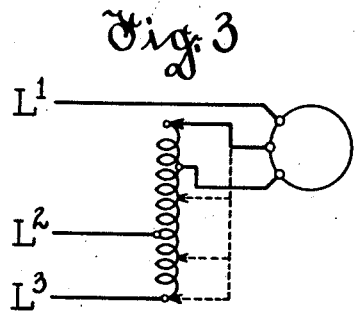
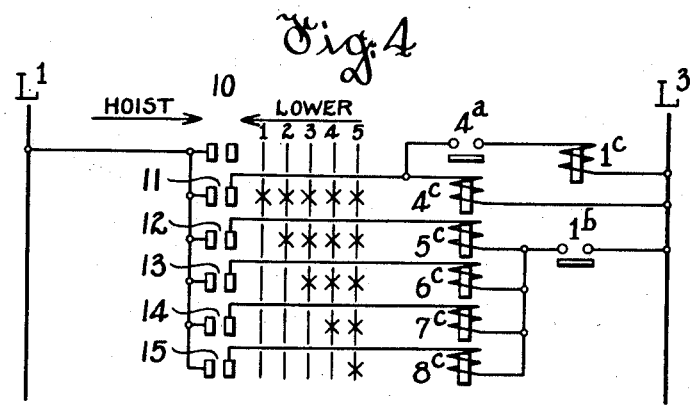
Inventor
Eric Pell
By [signature]
Attorney Patented Nov. 18, 1947

2,430,992

UNITED STATES PATENT OFFICE 2,430,992

BRAKING SYSTEM FOR POLYPHASE INDUCTION MOTORS

Eric Pell, Shorewood, Wis., assignor to Cutler-Hammer, Inc., Milwaukee, Wis., a corporation of Delaware Application July 30, 1945, Serial No. 607,687

4 Claims. (Cl. 172—179)

This invention relates to improvements in controllers for effecting braking of polyphase induction motors employed in hoist and other service.

A controller of this character which is now in use employs an autotransformer in one phase of the motor primary to effect unbalance of the voltages to which the motor primary is subjected thereby to effect braking action of the motor. Also such controller employs means to change certain of the taps of the autotransformer to which the motor is connected, for torque reversals and for graduation of the braking action of the motor, and the present invention is especially applicable to such form of controller.

An object of the present invention is to provide for controllers of the aforementioned and other types employing an autotransformer, improved tap shifting means of the electroresponsive type.

Another object is to provide electroresponsive tap shifting means which in the event of failure of the operating coil or coils thereof will not reduce the braking action of the motor.

Another object is to provide tap shifting means of the aforesaid character comprising switches which without need of interlocks other than those inherent therein will effect as an incident to change from one tap to another disconnection of the former tap.

Other objects and advantages of the invention will hereinafter appear.

The accompanying drawing illustrates an embodiment of the invention which will now be described, it being understood that the invention is susceptible of embodiment in other forms.

In the drawing:

Figure 1 shows diagrammatically a polyphase induction motor having its primary provided with control embodying the instant invention in one form;

Fig. 2 shows diagrammatically the primary control of the aforementioned controller in respect of which the instant invention is an improvement;

Fig. 3 is a simplified diagram of certain circuits common to the two controllers, and Fig. 4 shows diagrammatically the control circuits for certain of the switches shown in Fig. 1.

Referring to Fig. 1, the same shows a polyphase induction motor M which may be assumed to be employed in hoist service and having its primary supplied from lines $L^1$, $L^2$ and $L^3$ through a two-pole electroresponsive main switch 1 having its two sets of contacts included in circuit between the motor and lines $L^1$ and $L^3$, respectively. A two-pole electroresponsive switch 2 serves jointly with the main switch 1 to complete the usual primary connections of the motor M for hoisting operation, said switch 2 having its contacts included in circuit between the motor and lines $L^2$ and $L^3$, respectively. Fig. 1 also shows in part the customary secondary circuit of motor M inclusive of two sets of resistors $R^1$ and $R^2$, the secondary circuit being broken at X, as the secondary circuit is commonly provided with additional sets of resistors, certain of the sets of resistors commonly having electroresponsive or other means, not shown, to exclude the same from circuit as desired.

To effect connection of the motor for braking there is provided a double pole electroresponsive switch 4 which serves jointly with the main switch 1 to control the connections of the motor primary and the autotransformer to lines $L^1$, $L^2$ and $L^3$, while double throw electroresponsive switches 5, 6 and 7 are provided to interconnect the autotransformer and certain terminals of the motor. When main switch 1 and switch 4 are energized with switches 5, 6 and 7 deenergized they afford the motor primary connections shown in Fig. 3, which connections are common to controllers now in use and which afford the motor a high braking action with a limited torque in hoisting direction at zero speed of the motor as is fully set forth in the copending application of Ralph P. Anderson, Serial No. 482,273, filed April 8, 1943, and assigned to the assignee of the instant application.

However, in the control heretofore employed the commutatable interconnections between the autotransformer and the motor were controlled by single throw electroresponsive switches of the normally open type, as shown in Fig. 2, so that completion of the connections shown in Fig. 3 in full lines required energization of one of said switches. The same was true of the circuit commutations depicted by dotted lines in Fig. 3, and thus failure of the coil of the switch relied upon would cause opening of such switch and interruption of one phase of the motor circuit, with consequent impairment of the braking action of the motor. Also such switches required interlocking means to prevent undesired short-circuiting of turns of the autotransformer in shifting the connection between the middle terminal of the motor and the autotransformer.

Returning now to consideration of the controller of Fig. 1, the switches 5, 6 and 7 are of the double throw type respectively provided with normally engaged contacts $5^a$, $6^a$ and $7^a$, with normally disengaged contacts $5^b$, $6^b$ and $7^b$, and with operating windings $5^c$, $6^c$ and $7^c$. The switch 5 through its contacts $5^a$ normally connects the right hand end terminal of the autotransformer to contacts of switch 4 and thus when switch 4 responds it completes the commutatable connection between the autotransformer and the motor. While the switches 6 and 7 likewise tend through their contacts $6^a$ and $7^a$ to connect other taps of the autotransformer, said contacts $6^a$ and $7^a$ are respectively in series with the normally disengaged contacts of switches 5 and 6 so that said other taps are normally disconnected. However, when switch 5 is energized it breaks the connection between the end terminal of the autotransformer and switch 4, whereas it completes circuit from switch 4 through the now closed contacts 5ᵇ and the normally engaged contacts 6ᵃ to the transformer tap connected to contacts 6ᵃ. Similarly switch 6 when energized breaks the connection of the last mentioned tap and connects switch 4 through the now engaged contacts 6ᵇ and the normally engaged contacts 7ᵃ to the tap connected to contacts 7ᵃ. On the other hand, switch 7 when energized disconnects the last mentioned tap and through its then engaged contacts 7ᵇ connects switch 4 to the left hand end terminal of the autotransformer.

Thus should any one or all of switches 5, 6 and 7 suffer coil failure the previously established connection would be continued or reestablished, as the case might be, and the motor would continue to brake, adjustment for maximum braking being in nowise impaired by such coil failure. Also it will be noted that the switches 5, 6 and 7 inherently provide in shifting from one tap to another disconnection of the former tap to prevent short-circuiting of the turns of the autotransformer. In some instances it is desirable to include a resistor $r$ in the circuit completed by response of switch 7 which commonly excludes a greater number of autotransformer turns than do the others, and to provide a switch 8 later to exclude said resistor, said switch 8 having a control winding 8ᶜ.

Control of the switches for hoisting being well known, Fig. 4 has been confined to a showing of one form of control of switches 1, 4, 5, 6, 7 and 8 for lowering and braking, it being apparent that they may be controlled in various ways. In Fig. 4 are shown the windings 1ᶜ, 4ᶜ, 5ᶜ, 6ᶜ, 7ᶜ and 8ᶜ of the aforementioned switches and certain auxiliary contacts of the switches 1 and 4, said windings being under the control of a conventional type of drum controller 10 shown schematically and only in part. Contacts 11 of the drum are engaged in the first lowering position to connect the winding 4ᶜ across lines L¹, L³, and switch 4 in responding engages its contacts 4ᵃ to connect winding 1ᶜ across said lines. This provides for establishment by switches 1, 4 and 5 of the motor primary connections shown in full lines in Fig. 3. On the other hand, the drum when moved to its second, third, fourth and fifth positions progressively engages its contacts 12, 13, 14 and 15 to progressively connect across lines L¹ and L³ through contacts 1ᵇ of switch 1 the windings 5ᶜ, 6ᶜ, 7ᶜ and 8ᶜ. Switches 5, 6 and 7 thus respond in sequence to shift downwardly in Fig. 3, as indicated by dotted lines, the connection between the center terminal of the motor and the autotransformer.

As will be understood, this application does not purport to disclose fully a commercial form of control, many features of such a control having been deleted for simplicity of illustration of the instant invention.

What I claim as new and desire to secure by Letters Patent is:

1. The combination with a polyphase supply circuit, of a polyphase induction motor, an autotransformer and means to establish connections between the primary of said motor, said autotransformer and said supply circuit to subject the motor primary to voltage unbalance for braking of said motor, and means for changing from one tap to another of said transformer a connection to the motor primary for graduation of braking, the last mentioned means comprising an electroresponsive switch which when deenergized engages certain of its contacts to select for the last mentioned connection the first mentioned tap, and which when energized disengages said contacts and engages other of its contacts to select for said connection the second mentioned tap.

2. The combination with a polyphase supply circuit, of a polyphase induction motor, an autotransformer, means to establish connections between the primary of said motor, said autotransformer and said supply circuit to subject the motor primary to voltage unbalance for braking action of said motor, and means for connecting a lead from the motor to any one of a number of taps of said autotransformer selectively, for graduation of braking, the last mentioned means comprising a plurality of electroresponsive switches, each of which when energized acting to shift said motor lead to a different tap and which when deenergized acting to shift said lead back to a previously active tap.

3. The combination with a polyphase supply circuit, of a polyphase induction motor, an autotransformer, means to establish connections between the primary of said motor, said autotransformer and said supply circuit to subject the motor primary to voltage unbalance for braking action of said motor, and means for connecting a lead from the motor primary to any one of a number of taps of said autotransformer for graduation of braking, the last mentioned means comprising a plurality of electroresponsive switches each being deenergizable to engage a set of contacts thereof, and energizable to disengage such contacts and to engage a second set of contacts, the first mentioned contacts of said switches being individualized to the selectable taps and said switches having series connections between the normally closed contacts of certain of the same and the normally open contacts of other of the same to insure against connection by said switches of two or more taps simultaneously for any substantial period.

4. The combination with a polyphase supply circuit, of a polyphase induction motor, an autotransformer, means to establish connections between the primary of said motor, said autotransformer and said supply circuit to subject the motor primary to voltage unbalance for braking action of said motor, said means including a switch to complete a commutatable connection between said motor and said transformer, and commutating means for said connection comprising a plurality of progressively energized electroresponsive switches, the first electroresponsive switch when deenergized completing a circuit from one tap to said first mentioned switch, and when energized completing a circuit from said first mentioned switch to a different tap through contacts of another of said electroresponsive switches while the latter is deenergized.

ERIC PELL.

REFERENCES CITED

The following references are of record in the file of this patent:

UNITED STATES PATENTS

| Number | Name | Date |
|---|---|---|
| 2,089,837 | O'Hagan | Aug. 10, 1937 |
| 2,228,078 | Gullikson | Jan. 7, 1941 |
| 2,281,645 | Weed | May 5, 1942 |